United States Patent [19]

Beziers et al.

[11] Patent Number: 5,585,417
[45] Date of Patent: Dec. 17, 1996

[54] PROCESS FOR THE HARDENING UNDER IONIZING RADIATION OF A BIS-MALEIMIDE RESIN AND A COMPOSITE MATERIAL USING SAID RESIN

[75] Inventors: Daniele Beziers, St. Medard en Jalls; Yves Camberlin, Caluire; Evelyne Chataignier, St. Medard en Jalls; Patrice Dourthe, Rion des Landes, all of France

[73] Assignee: Aerospatiale Societe Nationale Industrielle, France

[21] Appl. No.: 627,331

[22] Filed: Apr. 4, 1996

Related U.S. Application Data

[63] Continuation of Ser. No. 402,967, Mar. 10, 1995, abandoned, which is a continuation of Ser. No. 830,649, Feb. 4, 1992, abandoned.

[30] Foreign Application Priority Data

Feb. 15, 1991 [FR] France ................... 91 01835

[51] Int. Cl.$^6$ ................................................. C08F 2/46
[52] U.S. Cl. .................. 522/103; 522/117; 522/120; 522/121; 522/167
[58] Field of Search .................... 522/167, 117, 522/120, 121, 103

[56] References Cited

U.S. PATENT DOCUMENTS

| | | | |
|---|---|---|---|
| 4,100,140 | 7/1978 | Zahir | 526/212 |
| 4,413,107 | 11/1983 | Locatelli | 528/322 |
| 4,552,815 | 11/1985 | Dreher | 428/423.3 |
| 4,568,733 | 2/1986 | Parker | 428/473.5 |
| 4,582,883 | 4/1986 | deKoning | 526/262 |
| 4,766,179 | 8/1988 | Dekoning | 525/256 |
| 4,789,505 | 12/1988 | Beziers | 522/3 |
| 4,973,649 | 11/1990 | Camberlin | 528/322 |
| 5,053,474 | 10/1991 | Camberlin | 528/322 |
| 5,075,398 | 12/1991 | deKoning | 528/322 |

FOREIGN PATENT DOCUMENTS

| | | |
|---|---|---|
| 0206383 | 12/1986 | European Pat. Off. . |
| 2427346 | 12/1979 | France . |

*Primary Examiner*—Mark Chapman
*Attorney, Agent, or Firm*—Hayes, Soloway, Hennessey, Grossman & Hage, P.C.

[57] ABSTRACT

Process for the hardening, curing or setting of a bis-maleimide resin and a composite material using said resin.

The setting process according to the invention of a basic resin A having at least one bis-maleimide monomer consists of adding to the basic resin A, prior to the use thereof, at least one reactive diluent B consisting of a monomer having a copolymerizable vinyl termination with the basic resin A when subjecting the mixture of the basic resin A and the diluent B to the action of ionizing radiation (34), the total quantity of the diluent B being such that the maleimide functions of the basic resin A are consumed following the ionizing radiation action and being chosen in the range 10 to 50 parts by weight for 100 parts by weight of the basic resin A. This resin is more particularly intended for the production of a composite material (16, 18) having a fibrous reinforcement (26, 28, 30, 32) by filamentary winding.

7 Claims, 3 Drawing Sheets

PROCESS FOR THE HARDENING UNDER IONIZING RADIATION OF A BIS-MALEIMIDE RESIN AND A COMPOSITE MATERIAL USING SAID RESIN

This is a continuation of application Ser. No. 08/402,967 filed on Mar. 10, 1995, now abandoned which is a continuation of Ser. No. 07/830, 649 filed on Feb. 4, 1992 now abandoned.

DESCRIPTION

The present invention relates to a hardening, curing or setting process under ionizing radiation of a bis-maleimide resin. This process is more particularly usable for the production of composite material parts which can be set or hardened under ionizing radiation and which must withstand high temperatures.

The composite materials to which the invention applies are materials formed from a resin and immiscible elements intended to give them special properties. These materials are more particularly constituted by an organic or mineral, fibrous reinforcement ensuring the strength and rigidity of the parts, as well as an organic matrix ensuring the connection between the reinforcing fibres and the transfer of forces between said fibres. The fibres are generally of glass, silica, carbon, silicon carbonitride or carbide, alumina or aramide.

These composite materials can be used in numerous industrial fields and in particular in the nautical, aeronautical, space and automotive fields, as well as in the field of competitive sports. In general terms, these composite materials can be used for producing lightweight mechanical parts having a high mechanical strength.

The organic matrixes used for the production of composite materials are generally constituted by a thermosetting resin, hardened under high pressures and high temperatures requiring the use of an autoclave. The hardening or curing of a resin corresponds to its polymerization and/or crosslinking.

Hot resin setting or curing processes give composite materials having high performance characteristics from the mechanical standpoint, but which suffer from deficiencies due to thermal effects such as critical, internal stresses and delaminations in the case of thick mechanical parts. Moreover, the polymerization time is extremely long, which is very disadvantageous from the financial standpoint with respect to energy consumption and capital costs.

Hardening, curing or setting processes by radiation, such as electron, ultraviolet, gamma and X-rays permit a polymerization and/or crosslinking without raising the temperature. They make it possible to obtain composite materials having a very good quality in a relatively short time and using relatively low energy levels. Moreover, these cold hardening processes are compatible with all types of fibres used in the composition of the composite material.

A process for the setting or hardening of resin by ionizing radiation for the production of composite material parts is in particular described in FR-A-2 564 029. These resins are thermosetting and have an acrylic termination.

If a thermosetting resin is exposed to a temperature above its glass transition point, the resin definitively loses all its mechanical properties. In addition, thermosetting resins can only be used for temperatures below their glass transition point.

Resins which are polymerizable under ionizing radiation and which are currently used in composite materials are resins having an acrylic termination and more particularly epoxy resins with an acrylic termination. However, the known epoxy resins having the best performance characteristics from a mechanical and thermal standpoint have glass transition points of approximately 200° C. Therefore their use is limited to low temperature applications, particularly below 180° C.

Thermosetting resins of the bis-maleimide type have the advantage, compared with epoxy resins, of a high glass transition point of approximately 300° C. permitting their use in high temperature applications (exceeding 250° C.).

Unfortunately the presently known bis-maleimide-based composition can only be thermally set, hardened or cured. Therefore they suffer from the disadvantages of said hardening procedure. Moreover, these resins have a high viscosity, being solid at ambient temperature, which requires appropriate performance procedures. In particular, the production of a composite material with a fibrous reinforcement requires a reinforcement impregnation temperature of approximately 100° C., which makes this impregnation stage more complicated, thereby also increasing the cost. In addition, the time during which said composition can be handled is inadequate for the production of composite material parts, especially when using filamentary winding.

The object of the invention is therefore to produce composite materials having a matrix based on bis-maleimide resin and cold polymerized under ionizing radiation and which can be used in cases requiring high thermal and mechanical properties. The invention also relates to a process for the setting, hardening or curing under ionizing radiation of a bis-maleimide-type resin, as well as to a composite material using this resin making it possible to obviate the aforementioned disadvantages.

More specifically, the present invention relates to a process for hardening under ionizing radiation a basic maleic resin A having at least one bis-maleimide monomer (a), consisting of adding to the basic resin A, prior to its use, at least one reactive diluent B consisting of a monomer having a final termination copolymerizable with the basic resin A on subjecting the mixture of the basic resin A and the diluent B to ionizing radiation, the total quantity of diluent B being such that the maleimide functions of the basic resin A are consumed after the action of the ionizing radiation and being chosen in the range 10 to 50 parts by weight for 100 parts by weight of the basic resin A, followed by subjecting the mixture to ionizing radiation.

The action of ionizing radiation will be subsequently referred to as "irradiation".

According to the invention, the term "ionizing radiation" means ultraviolet, visible, beta, gamma or Xradiation and "hardening" means polymerization and/or cross-linking.

After irradiation, the reactive diluent or diluents B according to the invention make it possible to obtain bis-maleimide crosslinking levels exceeding 95%. In general terms the reactive diluent or diluents B have in each case a main carbon chain with 1 to 20 carbon atoms and preferably 1 to 10 carbon atoms.

The reactive diluent B can be formed by acrylate monomers of the trimethylol propane triacrylate (THPTA) type of formula:

trimethylol propane trimethacrylate (THPTH) of formula:

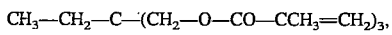

triallylcyanurate of formula:

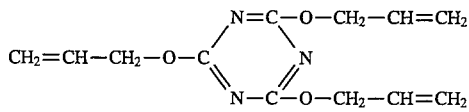

It is also possible to use styrene and alkyl styrenes, whereof the alkyl radicals have in each case 1 to 5 carbon atoms, such as 2-methyl styrene, 3,4-methyl styrene or divinyl benzene (DVB). It is also possible to use N-vinyl-2-pyrrolidone (NVP), butyl vinyl ether (BVE), vinyl anisoles such as 4-vinyl anisole and vinyl pyridines such as 4-vinyl pyridine, etc.

These reactive diluents B can be used alone or in combined form as a Function of the sought performance conditions and in particular according to the sought viscosity.

The choice of the reactive diluent or diluents B will essentially depend on the envisaged application, as well as the pot life of the mixture of the basic resin A and the reactive diluent B.

The pot life is the time during which the sought viscosity for the use of the mixture of resin A and diluent B does not or substantially does not change. For example, for the impregnation of a Fabric, the viscosity of the resin A-diluent B mixture during the impregnation must remain in the range 0.5 to 1Pa. s. Moreover, for the production of a part by resin injection, said mixture must have a very low viscosity, approximately 0.5 Pa.s.

As a function of the envisaged application, the time during which the viscosity of the resin A-diluent B mixture musk remain substantially constant is advantageously between 1 and 20 hours.

Formulations polymerizable under ionizing radiation and based on DVB or styrene are much more reactive than the other formulations, but their pot life is short and requires rapid use. Conversely their glass transition point is very high. NVP represents the best compromise between the handling requirement and the pot life of the resin A-diluent B mixture on the one hand and the glass transition point on the other.

A formulation only containing basic maleic resin A does not have an adequate thermal characteristic spectrum following ionizing radiation, because its glass transition point is below 100° C. By inventively mixing the maleic basic resin A with the reactive diluent or diluents B, the glass transition points for the same basic resins A can increase from 250° to 360° C. after irradiation.

The optimized quantity of reactive diluent B is determined by physicochemical analysis and is obtained when, after irradiation, the maleimide functions are completely consumed and there are no vinyl functions in excess. Moreover, to obtain a high bis-maleimide crosslinking level, the diluent quantity is chosen between 10 and 50 parts by weight and advantageously 20 to 40 parts by weight and even better 30 to 40 parts by weight for 100 parts by weight of the basic resin A.

To assist the mixing of the basic resin A and the reactive diluent B, it can be advantageous to melt the basic resin A and add it, accompanied by slow stirring, to the heated reactive diluent B.

As a Function of the desired mechanical characteristics for the composite material and according to the process used for producing said composite materials, it is possible to adapt the composition of the basic resin A. Thus, the basic resin A can contain either one or more bis-maleimide monomers (a), or one or more bis-maleimides (a) mixed with one or more special maleimides (b) permitting the formation of a eutectic, to which is optionally added an acrylate (c) and optionally a stabilizer (d) making it possible to advance the chemical reaction between the bis-maleimide(s) (a) and the maleimide(s) (b), so as to avoid a recrystallization, or one or more bis-maleimide monomers (a) mixed with an allyl phenyl (e), or one or more bis-maleimides (a) mixed with a polythiol and with a polyacrylate (g) (cF. JP-A-57 108 159).

The bis-maleimides (a) to which the invention applies are in particular N,N'-bis-maleimides of formula (I):

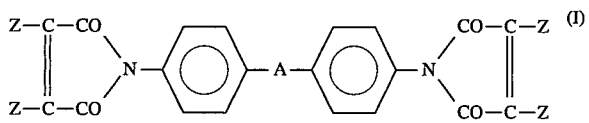

in which:

the symbols Z, the same or different, in each case represent H, CH$_3$ or Cl;

the symbol A represents a single valency bond or a group:

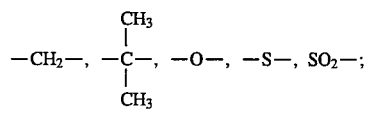

As a specific example of bis-maleimides (a) of formula (I), reference can be made to:

N,N'-4,4'-diphenylmethane-bis-maleimide,

N,N'-4,4'-diphenylether-bis-maleimide,

N,N'-4,4'-diphenyl-2,2-propane-bis-maleimide,

N,N'-4,4'-diphenylsulphur-bis-maleimide,

N,N'-4,4'-diphenylsulphone-bis-maleimide.

It is also possible to use other bis-maleimides, such as N,N'-hexamethylene-bis-maleimide, N,N'-phenylene-bis-maleimide, N,N'-4,4'-diphenyl-1,1-cyclohexane-bis-maleimide, N,N'-4,4'-diphenylmethane-bis-chloromaleimide.

As the allyl phenyl (e) usable in association with the bis-maleimide (a) described hereinbefore, reference can be made to allyl phenyls having 1 to 4 phenyl nuclei, whose main chain can have 8 to 30 carbon atoms. For example, it is possible to use o,o-diallylbisphenol A, whose formula (b') is given in appendix I or 1,3-bis-(o-allylphenoxy)-benzene of formula (b") given in appendix I.

The maleimide (b), optionally associated with the bis-maleimide (a) with a view to lowering its melting point, is chosen from among the compounds of formulas (1) to (:11) given in appendices II and III.

The bis-maleimides (a) and maleimides (b) given hereinbefore are prepared according to the processes described in U.S. Pat. No. 3,018,290 and British patent GB-A-1 137 290.

The stabilizer (d) optionally added to the bis-maleimide/ maleimide mixture (a+b) with a view to avoiding the recrystallization thereof is a compound chosen from among vinyl pyridines, N-vinyl-2-pyrrolidone, vinyl tetrahydrofuran, styrene and mixtures thereof.

The acrylate reagent (c) optionally mixed with the bis-maleimide (a) and maleimide (b) hereinbefore consists of one or more compounds of general formula:

in which;

the symbol $R_1$ represents a hydrogen atom or a methyl radical, n represents a whole number or fraction at least equal to 1 and at the most equal to 8, the symbol G represents an organic radical of valency n derived: from a straight or branched, saturated aliphatic radical having 1 to 30 carbon atoms and able to contain one or more oxygen bridges and/or one or more free hydroxyl functions; an aromatic radical (of the aryl or aryl aliphatic type) having 6 to 150 carbon atoms constituted by a benzene nucleus and which can be substituted by 1 to 3 alkyl radicals having 1 to 5 carbon atoms, or by several benzene nuclei, optionally substituted in the manner indicated hereinbefore and interconnected by a single valency bond, an inert group or an alkylene radical having 1 to 3 carbon atoms, said aromatic radical being able to contain at different locations in its structure one or more oxygen bridges and/or one or more free hydroxyl functions, the free valency or valencies of the aromatic radical G can be carried by a carbon atom of an aliphatic chain and/or by a carbon atom of a benzene nucleus.

When the basic maleic resin A contains a bis-maleimide (a) and a maleimide (b), the bis-maleimide (a) represents 50 to 90 and preferably 60 to 80% by weight of said binary mixture and the maleimide (b) represents 50 to 10 and preferably 40 to 20% by weight of said binary mixture.

When use is made of a supplementary acrylate (c) in said binary mixture, use is made of a quantity representing 5 to 50 and preferably 10 to 30% by weight of the complete mixture (a)+(b)+(c)+(d). For the supplementary stabilizer (d), use is made of a quantity representing 0 to 10 and preferably 2 to 8% by weight of the complete mixture (a)+(b)+(c)+(d).

The basic resin A containing a bis-maleimide (a), at least one maleimide (b), an acrylate (c) and a stabilizer (d) can be obtained in the manner described hereinafter.

Firstly an intimate mixture is formed between the bis-maleimide (a) and the maleimide(s) (b), by operating under stirring and at a temperature of at the most the melting point of the maleimide which is the most difficult to liquefy and which is generally between 50° and 250° C. and preferably between 80° and 180° C., until a homogeneous liquid medium is obtained (stage 1).

This is followed by the addition of the stabilizer (d) to the melted mixture, which is stirred and kept at a temperature identical to or different from that used in the preceding stage, generally between 50° and 250° C. and preferably between 80° and 180° C., the reaction mixture then being allowed to react under stirring for between e.g. 2 and 15 minutes prior the introduction of the acrylate reagent (c) (stage 2).

Finally, addition takes place of the acrylate reagent (c) and then the reaction medium is then again left to react under stirring for e.g. 2 to 15 minutes and then immediate pouring takes place of the prepolymer A formed outside the reactor used for preparation purposes (stage 3). This prepolymer is then stored up to the time of its use for forming a resin according to the invention.

The viscosity in the melted state of the thus obtained prepolymers can easily be adjusted to the desired value between 0.1 and 50 Pa.s, by acting on the nature and respective proportions of the compounds used, as well as on the temperature and duration of the different stages of the production process defined hereinbefore.

According to the invention, the reactive diluent B and the stabilizer (d) can be the same or different. When they are the same, they can be simultaneously added during stage 2. In this case, the mixture obtained after the addition of the acrylate reagent (c) is immediately ready for use and can be hardened under ionizing radiation. The process according to the invention is of particular interest for the production of composite materials having a fibrous reinforcement and having a high thermal stability.

In particular, the process according to the invention can be used for the production of composite material parts using various known processes such as pouring, casting, filamentary winding, unidirectional or multidirectional draping, preimpregnation, injection, etc.

The invention also relates to a process for the production of a composite material having a fibrous reinforcement embedded in an organic matrix and consisting of adding to a basic maleic resin A having at least one bis-maleimide monomer (a), prior to its use, at least one reactive diluent B consisting of a monomer having a copolymerizable vinyl termination with the basic resin A, when a mixture of the basic resin A and the diluent B is subject to ionizing radiation, the total quantity of the diluent B being such that the maleimide functions of the basic resin A are largely consumed following the action of the ionizing radiation and being chosen in the range 10 to 50 parts by weight for 100 parts by weight of the basic resin A; impregnating the fibrous reinforcement of the mixture obtained; and subjecting the impregnated reinforcement to ionizing radiation in order to harden the basic resin.

The basic resin A, the diluent B and their concentrations are the same as hereinbefore.

This process for the production of the composite material can be performed with known means and in particular using the electron or X-radiation polymerization apparatus described in FR-A-2 564 029.

The fibrous reinforcement can comprise woven, braided or wound filaments of alumina, glass, carbon, silicon carbide or carbonitride, boron alumino silicate, aramide, etc.

The irradiation of a basic resin A-reactive diluent B mixture according to the invention permits an at least 98% conversion of the maleimide functions of the basic resin for the mixture only.

The conversion level of these functions is approximately 84 to 88% for a composite material. To obtain an optimization of the mechanical properties, an afterbaking of the material at a temperature of 180° to 300° C. under atmospheric pressure and for 30 minutes to 8 hours can be envisaged. In practice, afterbaking takes place at 180° to 250° C. for 2 to 8 hours.

The irradiation doses of the basic resin A-reactive diluent B mixture are high being in the range 100 to 350 kGy and preferably 250 to 350 kGy. These irradiation doses are obtained by passing under a particle accelerator each basic resin A-reactive diluent B mixture at a certain speed. This speed is a function of the dose and the characteristics of the accelerator, i.e. D=K/V, in which D is the irradiation dose in kGy, K is a parameter dependent on the characteristics (energy and power), as well as the settings of the accelerator scanning frequency, scanning width, pulse frequency) and V represents the mixture travel speed. For a 10 MeV, power 10 kW electron accelerator, 10 kGy=2 m/min is obtained.

In view of such high doses at excessively slow speeds (6 to 7 cm/min), which is difficult to obtain with industrial means, it is advantageous to use a dose distribution by successive passages of the mixture under the accelerator. The best compromise is formed by a unitary passage of 50 kGy. which corresponds to a speed of 40 cm/min.

The invention also relates to the use of at least one monomer with an acrylic termination as defined hereinbefore as the reactive diluent B for the hardening under ionizing radiation of a basic maleic resin A having at least one bis-maleimide monomer (a), said at least one monomer being used at a rate of 10 to 50 parts by weight for 100 parts by weight of the basic resin A.

Other features and advantages of the invention can be gathered from the following illustrative, non-limitative description and with reference to the attached drawings, wherein show:

FIG. 1 The influence of the nature of the reactive diluent on the crosslinking rate of the basic maleic resin A, in this case the residual energy Er expressed in J/g, as a function of the irradiation dose D expressed in kGy.

FIG. 2 The influence of the diluent quantity B, expressed in % by weight, on the conversion rate (%) C of the maleimide functions.

FIG. 3 The influence of the diluent quantity Dil, expressed in % by weight, on the residual polymerization energy Er expressed in J/g.

FIG. 4 The variations of the conversion percentage C of the maleic functions as a function of the irradiation dose D expressed in kGy.

FIG. 5 An example for producing a composite material according to the invention using filamentary winding.

EXAMPLE 1

100 parts by weight of N,N'-4,4'-diphenyl methane-bis-maleimide in the form of a fine powder, called compound M, and 40 parts by weight of NVP are mixed hot. The mixture is in the form of a suspension, which is mechanically stirred. Following 300 kGy irradiation, using successive irradiations of 50 kGy each and using an electron beam produced by a 10 MeV, 10 kW power accelerator, a completely translucent solid is obtained with a glass transition point of approximately 330° C. This material can be used as a thermal insulator.

EXAMPLE 2

To 100 parts by weight of a basic resin A containing 100 parts by weight of N,N'-4,4'-diphenyl methane-bis-maleimide and 80 parts by weight of o,o-diallyl-bis-phenol A (formula e') and heated to 80° C. are added, accompanied by slow stirring, 40 parts by weight of NVP heated to 40° C. Cooling then takes place and the mixture undergoes electron bombardment of 300 kGy, as described in example 1. This gives a homogeneous solid having thermal properties inferior to those of the product according to example 1, but with identical applications.

EXAMPLE 3

A description is given hereinafter of the production of a basic maleic resin A containing a bis-maleimide monomer (a), a maleimide monomer (b), N-vinyl-2-pyrrolidone as the stabilizer (d) of the bis-maleimide/maleimide eutectic and an acrylic (c).

Stage 1

Into a 350 cm³ glass reactor, equipped with a stainless steel anchor-type stirrer and preheated by the introduction of the said reactor into an oil bath at 165° C., are introduced in 12 minutes and accompanied by stirring a mixture of 165.33 of N,N'-4,4'-diphenyl methane-bis-maleimide (compound M) and 69.56 g of N,N'-methyl-4-phenylene-1,3-bis-maleimide.

The mixture is stirred until complete melting of the ingredients and the obtaining of a homogeneous liquid mass, said supplementary stirring lasting 5 minutes.

Stage 2

This is followed by the addition to the homogeneous liquid mass of 17.82 g of N-vinyl-2-pyrrolidone and this is left to react, under stirring, for 5 minutes.

Stage 3

The reactor is removed from the heated oil bath and then to the still stirred reaction mass is added a mixture of 26.76 g of di-(di-oxyethylated) his-phenol A diacrylate, said compound being available commercially under the registered trademark EBECRYL 150 from UCB and 53.53 g of acrylate compound consisting of a basic mixture of 80% by weight of a novolak epoxy diacrylate of formula (III) in appendix I, in which $R_1=R_2=H$ and t is a number equal to approximately 3, and 20% by weight of trimethylol propane triacrylate, said compound being commercially available under the registered trademark EBECRYL 629 from UCB.

Following the introduction of these acrylate compounds, stirring is continued for 3 minutes and then the reaction mass obtained is poured into a metal container. After cooling to ambient temperature, the desired basic maleic resin A is obtained in the solid state with a viscosity at 80° C. of 5.5 Pa.s. This basic resin A is then stored up to the time of use and its hardening under ionizing radiation.

Prior to use, said maleic resin A (a+b+c+d) is heated to 80° C., accompanied by stirring. Moreover, the reactive diluent B consisting of a monomer having a vinyl termination copolymerizable with the basic resin A is heated to 40° C. This followed by the addition of the reactive diluent B to the basic resin A, accompanied by slow stirring and then cooling takes place to the use temperature. Finally, the mixture undergoes electron bombardment in order to harden the resin. The degree of crosslinking of the maleimide functions of the basic resin A exceeds 95%.

It is possible to prepare this prepolymer A just prior to use. In this case it is obviously unnecessary to allow the prepolymer to cool to ambient temperature in the metal container.

The Inventors have varied the nature of the reactive diluent B, its concentration in the mixture prior to irradiation and the irradiation doses. The results are given in FIGS. 1 to 4. The curves of FIGS. 1, 2 and 4 relate to the basic resin A of example 3 and those of FIG. 3 to the compound M alone. The concentration of diluent B is given in parts by weight for 100 parts by weight of the basic resin (a+b+c+d).

FIG. 1 gives the variations of the residual polymerization energy Er of the maleic resin A, expressed in J/g, as a function of the irradiation dose D, expressed in kGy, for different reactive diluents and different concentrations.

Curves 1 to 7 respectively correspond to 10 parts by weight BVE, 10 parts by weight styrene, 10 parts by weight NVP, 30 parts by weight BVE, 30 parts by weight NVP, 30 parts by weight DVB and 30 parts by weight styrene.

The residual energy Er is the energy necessary for terminating the crosslinking of the maleimide functions after irradiating the basic resin-diluent mixture with an electron beam of 10 MeV and a power of 10 kW.

The measurement of the residual energy Er takes place according to the known calorimetry method using differential scanning. The residual energy decreases when the crosslinking level of the maleimide functions increases during electron bombardment.

FIG. 1 shows that DVB and styrene with 30 parts by weight lead to the highest crosslinking level of the maleimide functions. The hardened resins obtained have high glass transition points of approximately 360° C. for the DVB-based resin and 350° C. for the styrene-based resin.

The resin-styrene and resin-DVB mixtures have very short pot life of approximately 30 min. However, the resin-NVP mixture has a suitable pot life (exceeding 12 h) for the production of the composite material, particularly by impregnating reinforcing fibres. Moreover, as can be gathered from FIG. 1, the residual energy of the hardened NVP-based resins is relatively low. Their glass transition point is approximately 300°C. for 30 parts by weight NVP.

FIG. 2 shows the variations of the conversion rate of the maleimide functions as a function of the final diluent B quantity introduced into the basic resin-diluent mixture. The conversion of the maleic functions C is given as a percentage and corresponds to the crosslinking rate of said functions.

The curve of FIG. 2 has been plotted for the basic resin (a+b+c+d+) and for NVP as the diluent B. The NVP concentration is given in parts by weight for 100 parts by weight of the basic resin A and the irradiation of the mixture took place with an electron beam at a dose or 300 kGy, as described hereinbefore.

The continuous line curves 8 and 9 relate to the diluent B NVP and the dotted line curves 10 and 11 to the diluent B styrene. Irradiation of the mixture before measuring the residual energy took place by electron bombardment. Curves 8 and 11 correspond to an electron bombardment or 100 kGy and curves 9 and 10 to an electron bombardment of 300 kGy.

Figure 1:
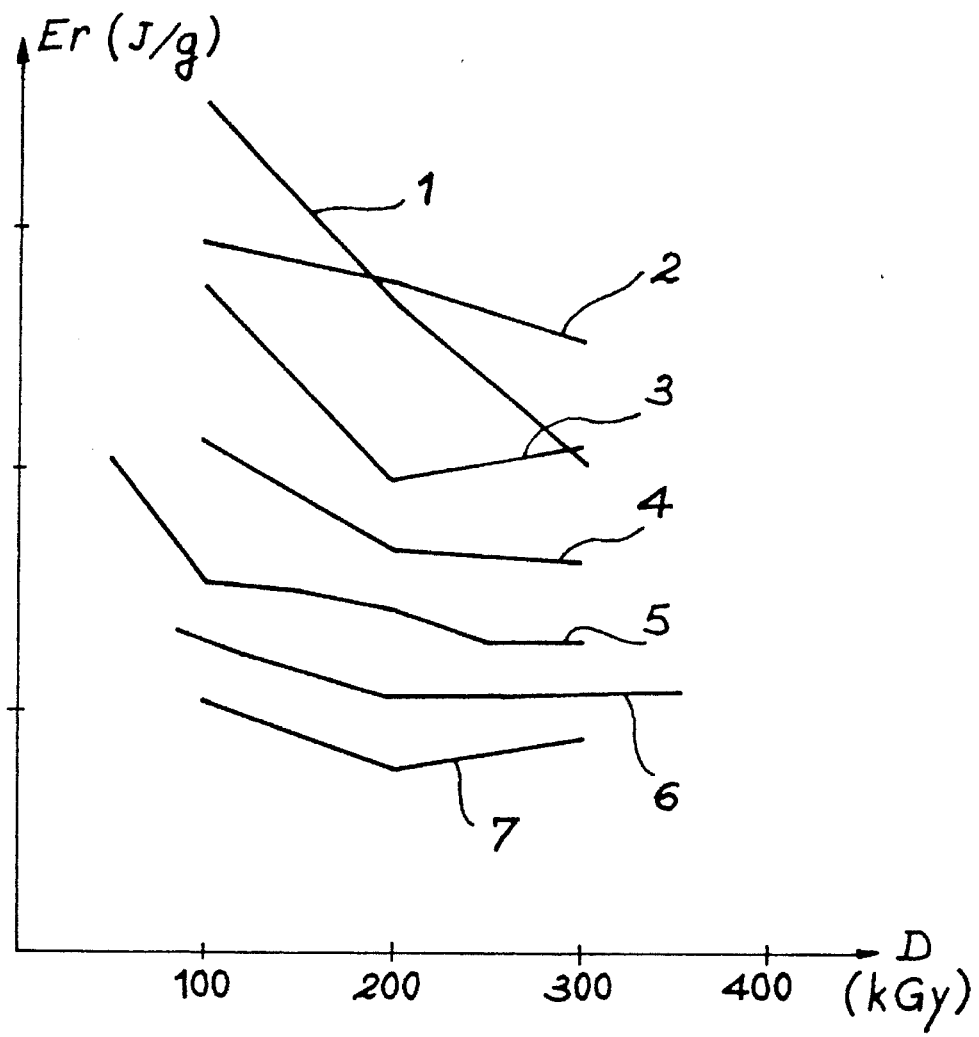
Figure 2:
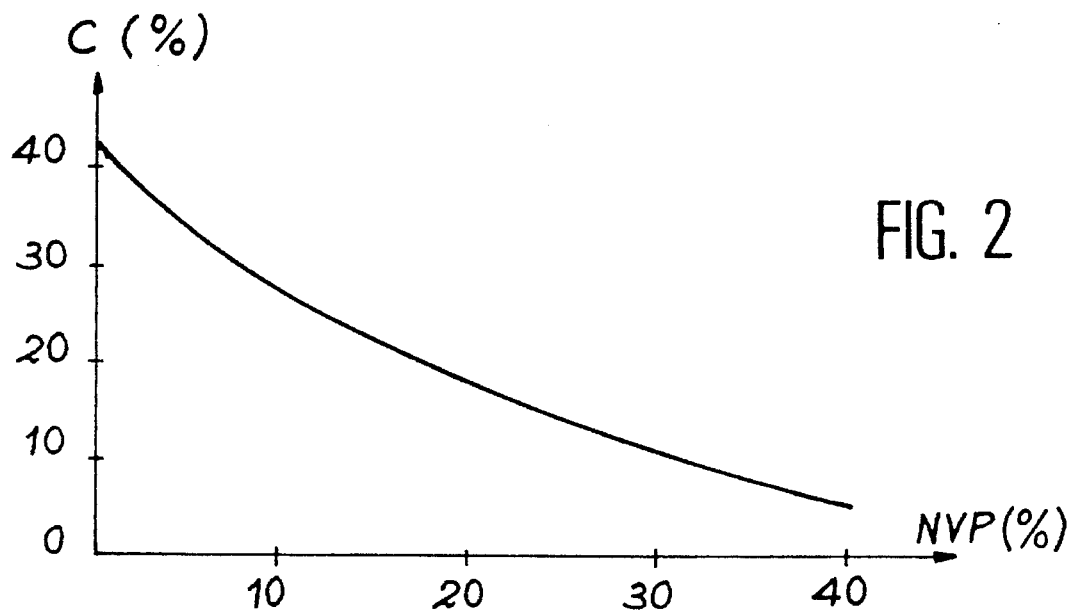
FIG. 2 shows that the conversion rate of the maleimide functions increases with the quantity of diluent B in the mixture. However, an excessive diluent quantity can lead to a homopolymerization of said diluent during the irradiation, which is prejudicial to the copolymerization or the bis-maleimide and the diluent and which can lead to glass transition points below those sought.
Figure 3:
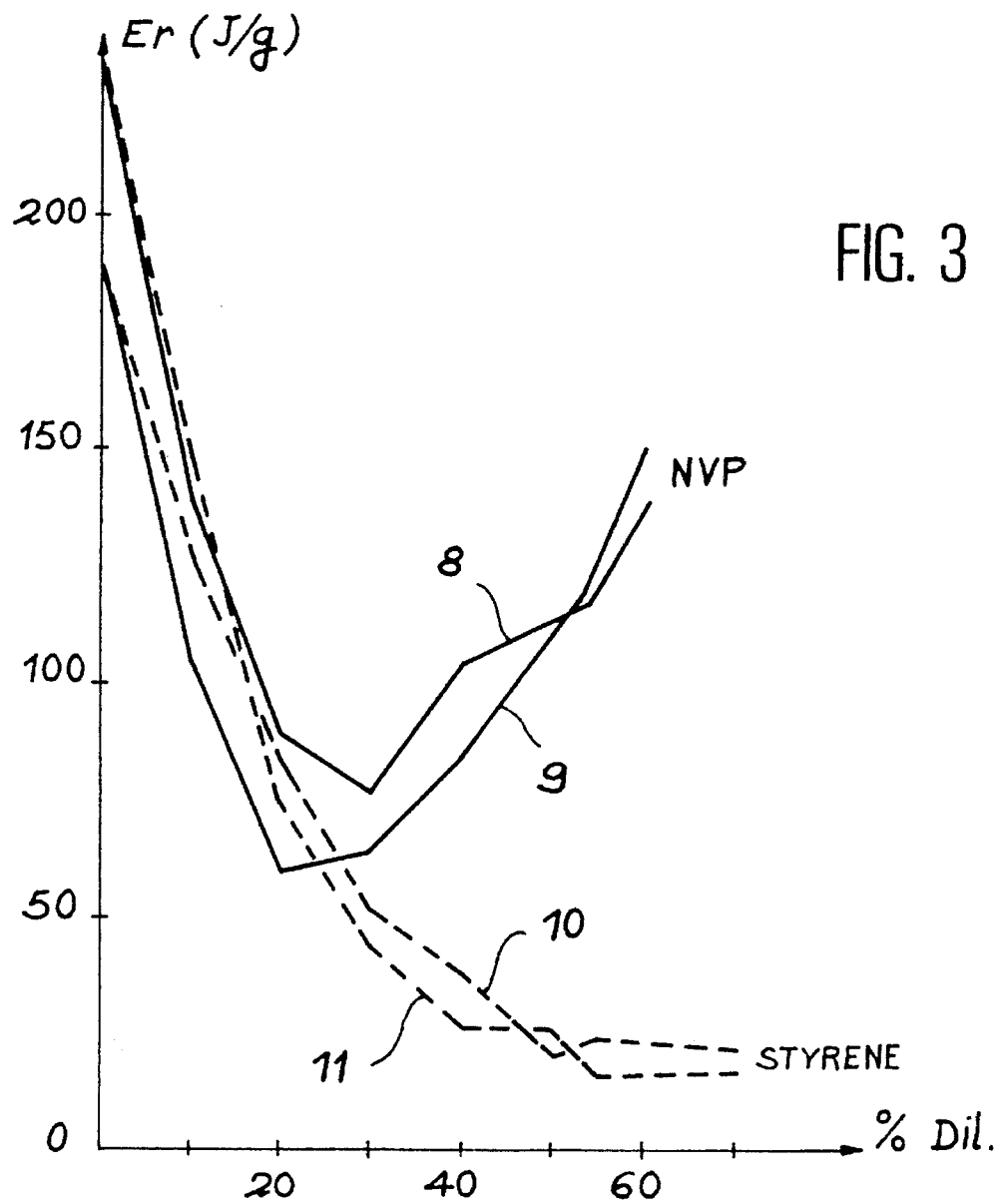
FIG. 3 shows the residual polymerization energy of the maleimide functions Er, exposed in J/g as a function or the diluent concentration in the mixture hardenable under ionizing radiation. The basic resin A is here constituted slowly by N,N'-4,4'-diphenyl methane-bis-maleimide (example 1).

The curves of FIG. 3 show that the optimized quantity of reactive diluent B is between 10 and 50 parts and preferably between 30 and 40 parts by weight for 100 parts by weight of the basic resin A. Above 50 parts by weight there is a homopolymerization of the vinyl diluent and below 10% by weight an inadequate conversion level.

The irradiation doses of the basic resin-diluent mixtures are high, being in the range 100 to 300 kGy. They are in particular 5 times higher than those used for the hardening of resins having an acrylic termination. However, with reference to FIG. 4, it can be seen that most of the maleimide functions are consumed between 50 and 100 kGy.

Figure 4:
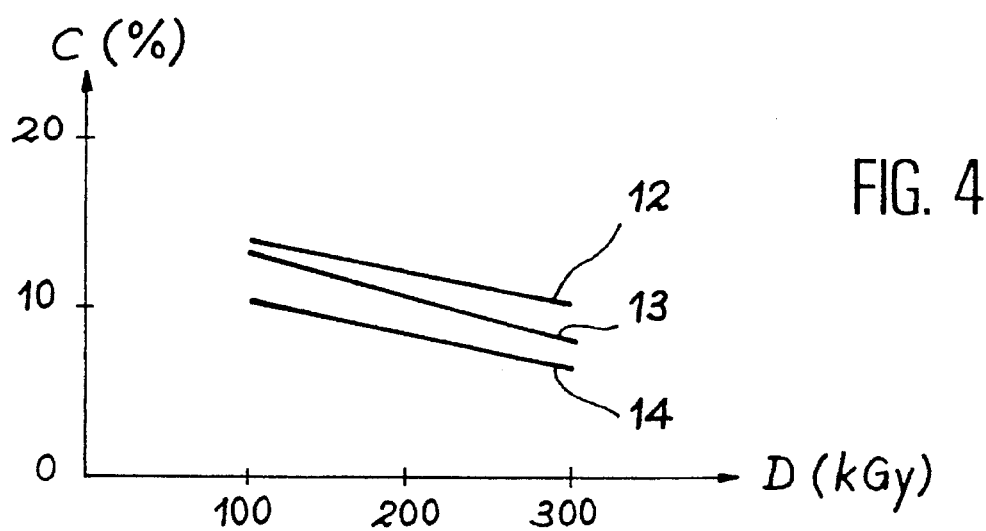

The curves of FIG. 4 give the variations of the conversion rate C expressed as a percentage, as a function of the irradiation dose D, expressed in kGy. Electron bombardment, is carried out in the manner described hereinbefore and curves 12, 13 and 14 respectively correspond to NVP as the diluent B at respective concentrations 33, 36 and 40 parts by weight for 100 parts by weight of the basic resin A, the latter having the composition given in example 3.

One of the major interests of the hardened bis-maleimide resins according to the invention compared with their thermally hardened homo logs is their low viscosity, which permits simpler realizations, equivalent to those used for epoxy resins with an acrylic termination. In particular, the bis-maleimide resin hardening process according to the invention is well adapted to the production of a composite material with a fibrous reinforcement by filamentary winding or fabric impregnation.

The following table I gives compared properties of a hot polymerizable bis-maleimide resin (BMI) and a bis-maleimide A-diluent B resin mixture polymerizable under ionizing radiation.

TABLE I

| | Thermal resin BMI | Resin BMI e⁻ (x) |
|---|---|---|
| Viscosity at ambient temperature | solid | 7.46 Pa.s |
| Filamentary winding or fabric impregnation temperature | 100° C. | 35–40° C. |
| Resin pot life of formulations | <3 h | >12 h (being defined) |

The mechanical characteristics of the bis-maleimide resins hardened according to the invention are also comparable to those of bis-maleimide resins which have been hardened hot. In particular, the bending characteristics of the hardened resin of example 3 are as follows:

bending stress=88 MPa flexural modulus=4230 MPa elongation=2 to 2.5%.

The polymerizable basic resin-diluent mixtures according to the invention are of particular interest in connection with the production of composite materials by filamentary winding. This production procedure for a composite material leads to a percentage of hardened resin (A+B) in the composite material of approximately 30% by weight.

The degree of polymerization of the maleimide functions obtained on composite materials is lower than that obtained for a basic resin-diluent mixture alone. The FTIR analyses (Fourier Transform InFrared Spectrometry) and $NMRC_{13}$ (Nuclear Magnetic Resonance of Carbon Atoms 13) give conversion levels for the maleimide functions of approximately 84 to 88% in composites. These composites still have interesting mechanical characteristics, such as an interlaminar shear stress of 37 MPa.

In order to bring about an optimization of the mechanical properties, an afterbaking is necessary. Following said afterbaking, the residual maleimide functions are below 6%. This afterbaking can be carried out at low temperature over a relatively long period of time, or at higher temperatures for a shorter time.

This afterbaking stage fulfils the same function as the afterbaking performed on the prior art polymerizable bis-maleimide resins. Advantageously, the afterbaking stage according to the invention is performed at a lower temperature than that of the thermal resins and for a much shorter time. Thus, the afterbaking of thermal bis-maleimide resins is 16 h at 250° C.

A study of the interlaminar shear stress of a composite material was carried out for different afterbaking conditions. The results appear in the following table II. The afterbaking was performed in connection with composite materials in the manner described in example 4.

TABLE II

| AFTERBAKING | Temperature °C. | — | 180 | 200 | 250 |
|---|---|---|---|---|---|
| | Duration h | | 8 | 4 | 2 |
| SHEAR STRESS | MPa | 37 | 50 | 48.3 | 50 |

EXAMPLE 4

Figure 5:
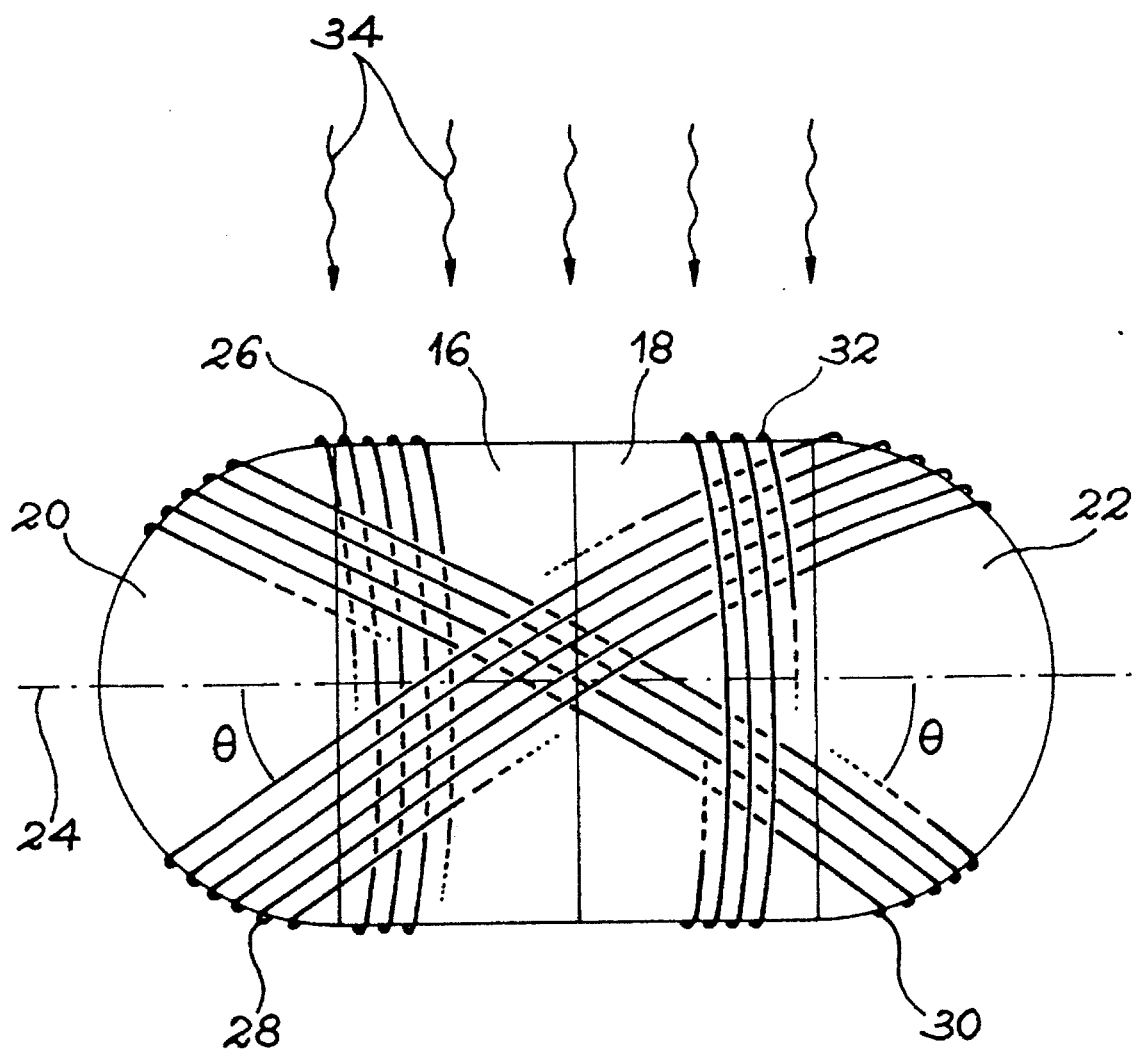

A description is given hereinafter of the production of two rocket engine interstage ferrules using filamentary winding. Winding was carried out on a carbon strand impregnated by a liquid formulation in freshly prepared form and containing 100 parts by weight of basic resin A, as described in example 3, and 40% by weight of NVP as the diluent B. The carbon strand is constituted by 3000 to 12000 filaments. Impregnation takes place by the continuous passage using a roller of the strand into the resin bath at a speed variable as a Function of the deposition trajectory and in known manner. This strand is wound onto the integral structure shown in FIG. 5 and which is constituted by two homothetic ferrules 16, 18 sandwiched between two identical hemispherical satellites 20, 22. The structure has an axis of revolution 24.

The two ferrules are essentially intended to operate in compression and are therefore produced in accordance with four successive windings, namely an internal winding 26 along the circumference of the Ferrules, two longitudinal windings 28 and 30, each forming an angle θ of 30° with respect to the axis 24 and finally an external winding 32 in accordance with the circumference.

The carbon strand impregnation temperature is 35° C. and the viscosity of the resin-diluent mixture is 0.5.10 Pa.s. The pot life of the polymerizable resin-diluent mixture according to the invention exceeds 12 h and the impregnation rate is 30% by weight.

The roller impregnation of the carbon strand takes place correctly and the deposition trajectories remain stable. Hardening of the material takes place at 300 kGy by 50 kGy passages at a speed of 20 cm/min rotating about the axis 24. The total irradiation time is 2 h. Winding is carried out with the same ease as for a carbon strand impregnated by an epoxy resin with an acrylic termination.

After polymerization under electron bombardment, the structure is cut up in order to recover the two ferrules 16 and 18. This is followed by the afterbaking of the ferrules at 180° C. for 8 h. There is a good dimensional stability before and after afterbaking.

COUNTEREXAMPLE

Using a thermally hardenable bis-maleimide resin, it is necessary to carry out two successive composite material baking stages under a pressure of 5 to $10.10^5$ Pa, namely 3 hours at 130° C. and then 5 hours at 200° C., followed by the afterbaking stage of 16 hours at 250° C.

The hot polymerization Lime of the thermal bis-maleimide resins consequently greatly exceeds the polymerization time under ionizing radiation of said same resins according to the invention.

The resins hardened according to the invention can be used for the production of any composite material having high thermal stability and a structure with a fibrous reinforcement.

APPENDIX I

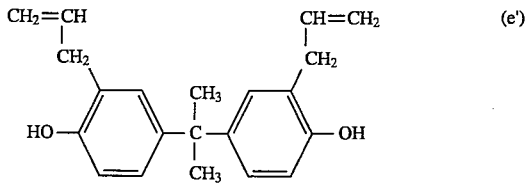

(e')

-continued
APPENDIX I

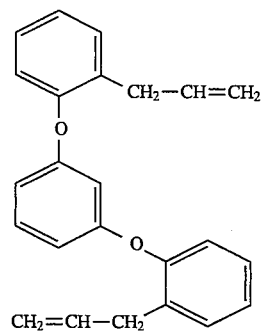

(e")

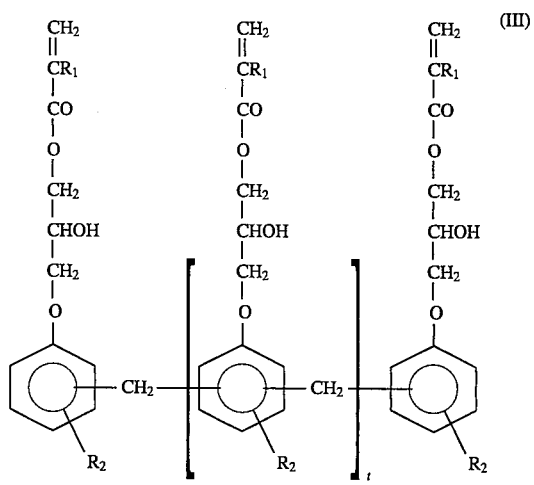

(III)

APPENDIX II

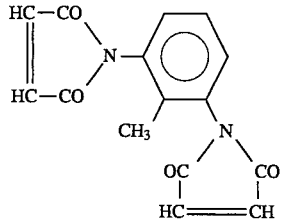

(1)

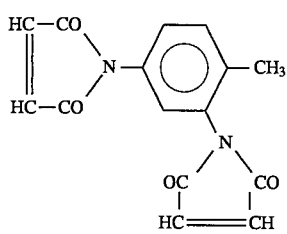

(2)

-continued
APPENDIX II

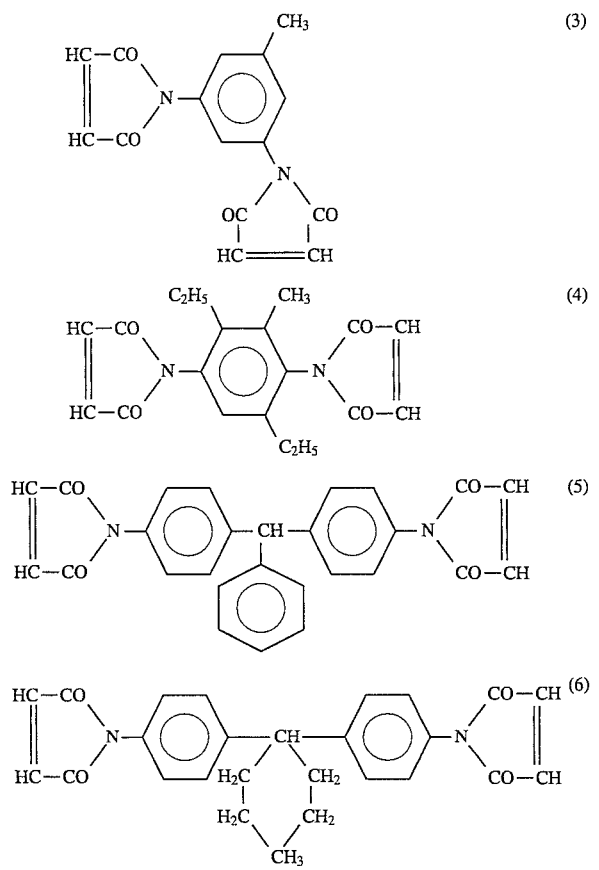

APPENDIX III

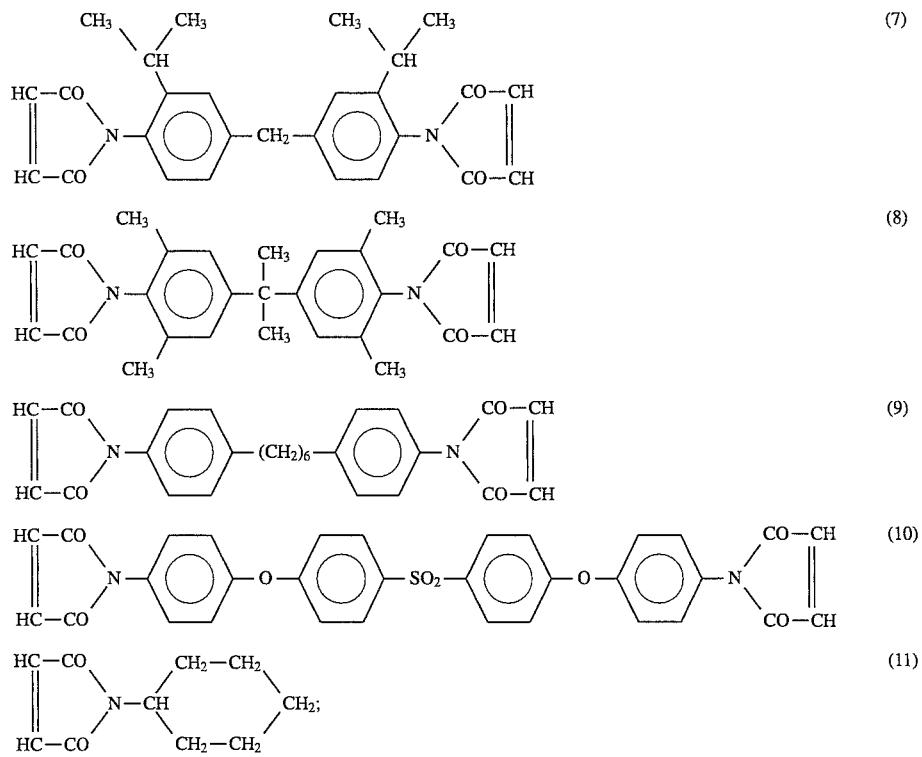

We claim:

1. Process for producing a composite material incorporating a fibrous reinforcement embedded in an organic matrix, said process comprising the steps of:

melting a basic maleic resin wherein the basic resin (A) has a viscosity in the melted state between 0.1 and 50 Pa.s and is the reaction product in a homogeneous liquid medium, at a temperature from 50° to 250° C., between the following reagents (a), (b), (c) and (d):

(a) is N,N'-bis-maleimide of formula $$Z-C-CO\diagdown_{N}\diagup^{CO-C-Z}_{\phantom{N}} \phantom{xx} (I)$$

(structure with two maleimide groups linked via two phenyl rings and bridge A)

in which:
the symbols Z, which are the same or different in each case represent H, $CH_3$ or Cl;
the symbol A represents a single valence bond or a group:

$$-CH_2-,\ -\underset{CH_3}{\overset{CH_3}{\underset{|}{C}}}-,\ -O-,\ -S-,\ SO_2-;$$

(b) consists of at least one maleimide selected from the group consisting of compounds of formula:

(7)

(8)

(9)

(10)

(11)

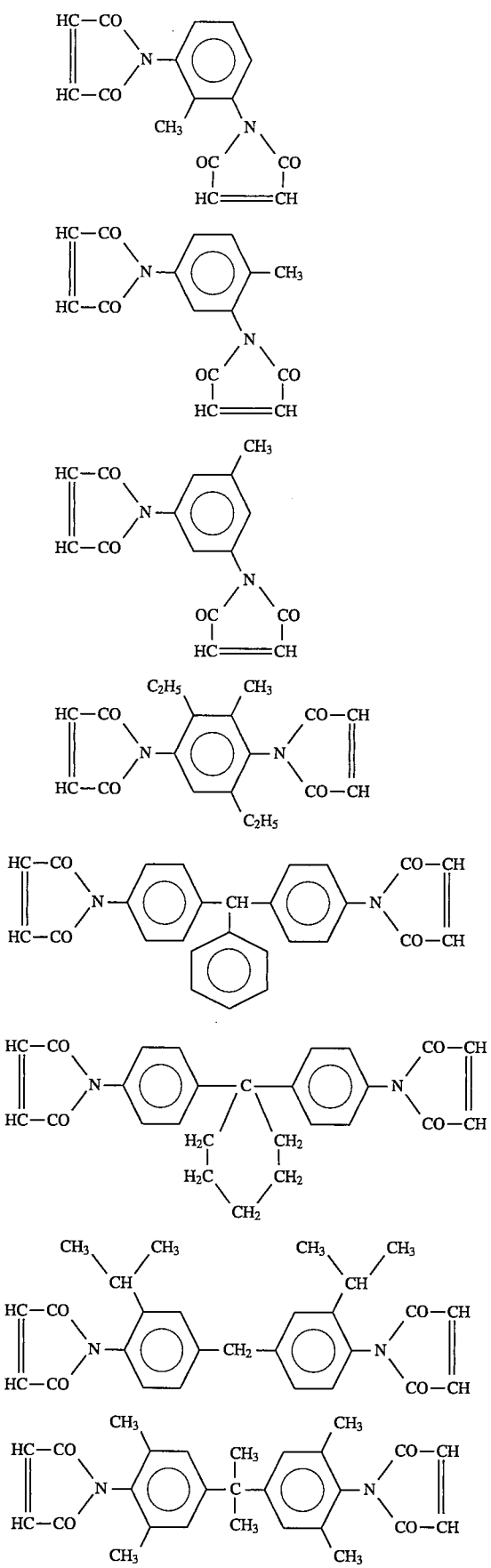

(c) is an acrylate reagent consisting of one or more compounds of general formula $$(CH_2=CR_1-CO-O)_n G \qquad (II)$$

in which the symbol $R_1$ represents a hydrogen atom or a methyl radical;

n represents a whole number or fraction at least equal to 1 and at the most equal to 8;

the symbol G represents an organic radical of valency n derived from: a straight or branched, saturated aliphatic radical having 1 to 30 carbon atoms and which can contain one or more oxygen bridges and/or one or more free hydroxyl functions; an aromatic radical of the aryl or arylaliphatic type having 6 to 150 carbon atoms constituted by a benzene nucleus and which can be substituted by 1 to 3 alkyl radicals having 1 to 5 carbon atoms or by several benzene nuclei, and interconnected by a single valence bond, an inert group or an alkylene radical having 1 to 3 carbon atoms, whereby said aromatic radical can contain at various locations of its structure one or more oxygen bridges and/or one or more free hydroxyl functions, the free valence or valences of the aromatic radical G can be carried by a carbon atom of an aliphatic chain and/or by a carbon atom of a benzene nucleus;

(d) is a reagent having a vinyl bond selected from the group consisting of vinyl pyridines, N-vinyl-2-pyrrolidone, vinyl tetrahydrofuran, styrene and mixtures thereof;

adding the basic resin A with a slow stirring to a heated reactive diluent B consisting of a N-vinylpyrrolidone being copolymerizable with the basic resin A on subjecting the mixture of the basic resin A and the diluent B to an ionizing radiation selected from X radiation or electron bombardment, the total quantity of diluent B being such that the maleimide functions of the basic resin A are largely consumed following the action of the ionizing radiation and being chosen in the range from 20 to 40 parts by weight for 100 parts by weight of the basic resin A;

impregnating a fibrous reinforcement with the obtained mixture; and subjecting the impregnated reinforcement to X-rays or electron bombardment for hardening the basic resin, wherein said amount of diluent B increases the resin value of Tg.

2. Process according to claim 1, wherein the total quantity of diluent B is from 20 to 40 parts by weight for 100 parts by weight of basic resin A.

3. A process according to claim 1, wherein the bis-maleimide monomer is N,N'-4,4'-diphenyl methane-bis-maleimide.

4. Process according to claim 1, wherein the irradiation dose is within the range from 250 to 350 kGy.

5. Process according to claim 1, wherein several successive irradiations are performed until the desired irradiation dose is obtained.

6. Process according to claim 5, wherein the irradiation dose at each irradiation is approximately 50 kGy.

7. Process according to claim 1, wherein the composite material undergoes baking at 180° to 300° C. and atmospheric pressure for 30 minutes to 8 hours.

* * * * *